US008647186B1

(12) United States Patent
Nottke

(10) Patent No.: US 8,647,186 B1
(45) Date of Patent: Feb. 11, 2014

(54) SLIDE POKER

(76) Inventor: Timothy G. Nottke, Toledo, OH (US)

( * ) Notice: Subject to any disclaimer, the term of this patent is extended or adjusted under 35 U.S.C. 154(b) by 30 days.

(21) Appl. No.: 13/436,953

(22) Filed: Apr. 1, 2012

Related U.S. Application Data

(60) Provisional application No. 61/470,509, filed on Apr. 1, 2011.

(51) Int. Cl.
*A63F 13/00* (2006.01)

(52) U.S. Cl.
USPC .................. 463/13; 463/12; 463/16; 463/17; 463/18; 463/19; 463/20; 463/25; 463/26; 463/27

(58) Field of Classification Search
USPC ........... 463/12-13, 16-20, 25-27; 273/138.1, 273/139, 271-274, 292, 293, 309
See application file for complete search history.

(56) References Cited

U.S. PATENT DOCUMENTS

| | | | | |
|---|---|---|---|---|
| 4,743,022 | A | 5/1988 | Wood | |
| 5,322,295 | A | 6/1994 | Cabot et al. | |
| 5,415,404 | A | 5/1995 | Joshi et al. | |
| 5,431,408 | A | 7/1995 | Adams | |
| 5,531,441 | A | 7/1996 | Dabrowski et al. | |
| 5,772,506 | A * | 6/1998 | Marks et al. | 463/13 |
| 5,823,873 | A | 10/1998 | Moody | |
| 5,868,619 | A | 2/1999 | Wood et al. | |
| 5,976,016 | A | 11/1999 | Moody et al. | |
| 6,007,066 | A | 12/1999 | Moody | |
| 6,012,720 | A | 1/2000 | Webb | |
| 6,098,985 | A | 8/2000 | Moody | |
| 6,132,311 | A | 10/2000 | Williams | |
| 6,416,407 | B1 | 7/2002 | Carrico et al. | |
| 6,450,883 | B1 | 9/2002 | O'Halloran | |
| 6,474,645 | B2 | 11/2002 | Tarantino | |
| 6,612,926 | B1 | 9/2003 | Dabrowski | |
| 6,612,927 | B1 | 9/2003 | Slomiany et al. | |
| 6,672,958 | B2 | 1/2004 | Bennett | |
| 7,037,190 | B2 | 5/2006 | Moody et al. | |
| 7,247,091 | B2 | 7/2007 | Moody | |
| 7,297,057 | B2 | 11/2007 | Gerrard et al. | |
| 7,614,946 | B2 | 11/2009 | Nicely | |
| 7,803,041 | B2 | 9/2010 | Gold et al. | |
| 7,857,693 | B1 | 12/2010 | Johnson et al. | |
| 8,029,358 | B2 | 10/2011 | Bigelow et al. | |
| 8,113,933 | B2 | 2/2012 | Thomas | |
| 2002/0034974 | A1 | 3/2002 | Wood et al. | |
| 2003/0038425 | A1 | 2/2003 | Tarantino | |
| 2003/0153377 | A1 | 8/2003 | Lisowski, Sr. | |
| 2004/0043807 | A1 | 3/2004 | Pennington | |
| 2004/0132524 | A1 | 7/2004 | Ramstad et al. | |
| 2005/0230917 | A1 | 10/2005 | Jackson | |
| 2007/0026920 | A1 | 2/2007 | Flint et al. | |
| 2010/0227663 | A1 | 9/2010 | Muskin | |
| 2011/0117980 | A1 | 5/2011 | Parham | |
| 2011/0218023 | A1 | 9/2011 | Hall | |

* cited by examiner

*Primary Examiner* — Sunit Pandya
(74) *Attorney, Agent, or Firm* — Donald K. Wedding

(57) ABSTRACT

Multiple, sequential video poker games wherein a player is dealt a first standard poker hand of 5 cards face up from a deck of cards such as a standard 52 card deck after a pre-determined wager is placed. The player holds or discards selected cards to create a final first poker hand. The Slide Bonus is triggered to play continuing multiple games when any pair is held or drawn in positions 4, 5 of the five card hand. The card positions are numbered 1, 2, 3, 4, 5 left to right or right to left.

18 Claims, 7 Drawing Sheets

SLIDE POKER

RELATED APPLICATION

This application claims benefit under 35 U.S.C. 119(e) of U.S. Provisional Patent Application Ser. No. 61/470,509 filed Apr. 1, 2011, incorporated herein by reference.

FIELD OF INVENTION

This invention relates to a system and method for playing slide video poker wherein a standard five card poker hand is dealt and a Slide Bonus is triggered when any pair is held or drawn on the first or last two cards in a standard five card poker hand. The cards for the five card poker hand are dealt from any suitable deck of cards including a single, standard deck of 52 cards using gaming industry standard apparatus such as a random number generator, a microprocessor, a graphic user interface, and a video display.

RELATED PRIOR ART

U.S. Patent Publication No. 2006/0287058 (Resnick et al.) discloses a gaming system with multiple game types, and is incorporated herein by reference.

The following references disclose an improved poker game: U.S. Pat. Nos. 7,137,628 (Moody), 7,222,856 (Dodge), 7,222,857 (Moody), 7,222,858 (Moody), and U.S. Patent Application Publication 2006/0281513 (Kirkpatrick), all incorporated herein by reference.

The following references disclose a gaming device with a bonus scheme: U.S. Pat. Nos. 6,506,118 (Baerlocher et al.), 6,514,141 (Kaminkow et al.), 7,022,016 (Wood et al.), and 7,247,092 (Jarvis et al.), all incorporated herein by reference.

The following prior art references disclose electronic or computerized gaming devices: U.S. Pat. Nos. 5,042,809 (Richardson), 6,248,016 (Walker et al.), 6,332,839 (Walker et al.), 7,022,016 (Wood et al.), 7,222,857 (Moody), 7,247,091 (Moody), and U.S. Design Pat. No. D395,463 (Scott et al.), all incorporated herein by reference.

U.S. Pat. No. 6,201,532 (Tode et al.) discloses an electronic gaming device with a deck mounted touch screen, and is incorporated herein by reference.

THE INVENTION

This invention relates to multiple, sequential video poker games wherein a player is dealt a first standard poker hand of 5 cards face up from a deck of cards such as a standard 52 card deck after a pre-determined wager is placed. The player holds or discards selected cards to create a final first poker hand. A Slide Bonus is triggered to play continuing multiple games when any pair is held or drawn in positions 4, 5 of the five card hand.

When a pair appears in positions 4, 5, and the Slide Bonus is triggered, a second poker hand is created by deleting the card in position 1, sliding or shifting the cards in positions 2, 3, 4, 5 to positions 1, 2, 3, 4 and dealing a replacement card into position 5. The pair is now in positions 3, 4. Play continues in the same manner for additional games three and four until the sliding pair is in positions 1, 2 of the fourth hand. This gives the player a total of four hands—three hands with the sliding or shifting pair that triggered the Slide Bonus, in addition to the outcome of the first hand, all of which will pay out according to a predetermined pay scale. The player may have up to four winnings hands. The winnings may be displayed on a credit meter.

The sequential numbering of the card positions 1, 2, 3, 4, 5 is arbitrary and can be right to left as illustrated in the drawings or left to right. Likewise, the Slide Bonus pair can be positioned in the positions 1, 2 and shifted to the left or right depending on the direction of the numbering of the positions. Thus the invention applies to a pair in either of the end positions 1, 2 or 4, 5 with the shifting of the pair in either direction left or right.

In other embodiments, other pair positions may trigger the Slide Bonus pair, for example, a pair in the first and second positions, a pair in the second and third positions, a pair in the third and fourth positions, or a pair in the first and fifth positions. The embodiments may have the pair slide or shift either direction to the right or to the left.

In another embodiment, the game is played in a multiple line format, for example, three five-card hands, five five-card hands, ten five-card hands, up to n five-card hands with each hand being played from a separate deck. In this embodiment, slide poker is played with each hand up to n hands.

In other embodiments, the Slide Bonus may be triggered when two or more cards form the beginning of a straight, two or more cards form the beginning of a flush, or two or more cards form the beginning of a royal flush combination.

In another embodiment, any pair in the first poker hand is selected by the player and is placed in one of the end positions 1, 2 or 4, 5 to trigger the Slide Bonus pair for the continuation of video poker games two, three, and four. This embodiment gives the player the option to chose between two different pairs dealt or drawn in the first poker hand.

Any or all of this game can be played with an actual dealer or with a computerized gaming console and video display screen such as a CRT or a flat screen display such as plasma, LCD, OLED, or LED. The game can be played on site at a legal game casino, in a non-gambling mode on-line over the internet, or off-line on a home computer using a disc such as a compact disc (CD), or digital video disc (DVD), or portable flash drive. The game can also be played in a gambling or non-gambling mode at a tavern, bar, home, or the like.

The game can be played with multiple hands and/or with multiple players. The game may also be played on a video game system such as Xbox Live, Playstation, or Wii. Xbox is a trademark of the Microsoft Corporation, Playstation is a trademark of the Sony Corporation, and Wii is a trademark of the Nintendo Corporation.

The gaming console may include standard industry apparatus such as a computer with an industry standard random number generator, a graphic interface, a video screen, and an integrated touch system to facilitate player input. The touch system may be an infrared (IR) touch system, capacitive touch system, resistive touch system, surface acoustical wave touch system, an inductive touch system, or other system mounted to a cabinet or to a bezel of the screen. A keyboard, cursor, or other input device may be used.

A typical game comprises the following steps:

1. A player activates the gaming process by placing a wager.
2. An opening hand is dealt. If a pair is dealt and held in the fourth and fifth positions of the hand, then the Slide Bonus feature is triggered.
3. The player holds/discards selected cards.
4. New cards are drawn to replace the discarded cards and complete the first hand. The player is paid for the highest five card hand that can be made based on a pre-determined pay scale for the first poker hand. The winnings may be displayed on a credit meter. If a pair is dealt and held or drawn in the fourth and fifth positions of this first hand, then the Slide Bonus feature is triggered.

5. When the Slide Bonus is triggered, a second poker hand is formed. The card in the first position drops off and is removed or deleted from the five card hand, the card in the second position moves to the first position, the card in the third position moves to the second position, and the Slide Bonus moves the pair of two cards from the fourth and fifth positions to the third and fourth positions. A new card is dealt and is placed in the fifth position creating the second poker hand.
6. The player is awarded the highest winning poker hand according to a predetermined pay scale for the second poker hand. The winnings may be displayed on a credit meter.
7. The Slide Poker continues to a third poker hand. The card in the first position drops off and is removed from the five card hand, the card in the second position moves to the first position, the Slide Bonus pair moves from the third and fourth positions to the second and third positions, and the card in the fifth position is moved into the fourth position. A new card is dealt and placed in the fifth position creating a third poker hand.
8. The player is awarded the highest winning poker hand according to a predetermined pay scale for the third poker hand. The winnings may be displayed on a credit meter.
9. The Slide Bonus continues to the fourth poker hand. The card in the first position drops off and is removed from the five card hand, the Slide Bonus moves the cards from the second and third positions to the first and second positions, the card in the fourth position is moved into the third position, and the card in the fifth position is moved into the fourth position. A new card is dealt and placed in the fifth position creating a fourth poker hand.
10. The player is now awarded the highest winning poker hand according to a predetermined pay scale for the fourth poker hand. The winnings may be displayed on a credit meter.
11. Play concludes after the payment of the fourth poker hand.

Although this invention has been described or a five card poker hand, it can also be practiced with six, seven, or n cards to a hand. The number of hands would be n−1. For example, if seven card stud is played, a total of six hands could be played.

The invention can also be practiced with a single standard 52 card deck, with a custom deck, with multiple standard decks, or with multiple custom decks.

DETAILED DESCRIPTION OF THE DRAWINGS

Figure 1A:
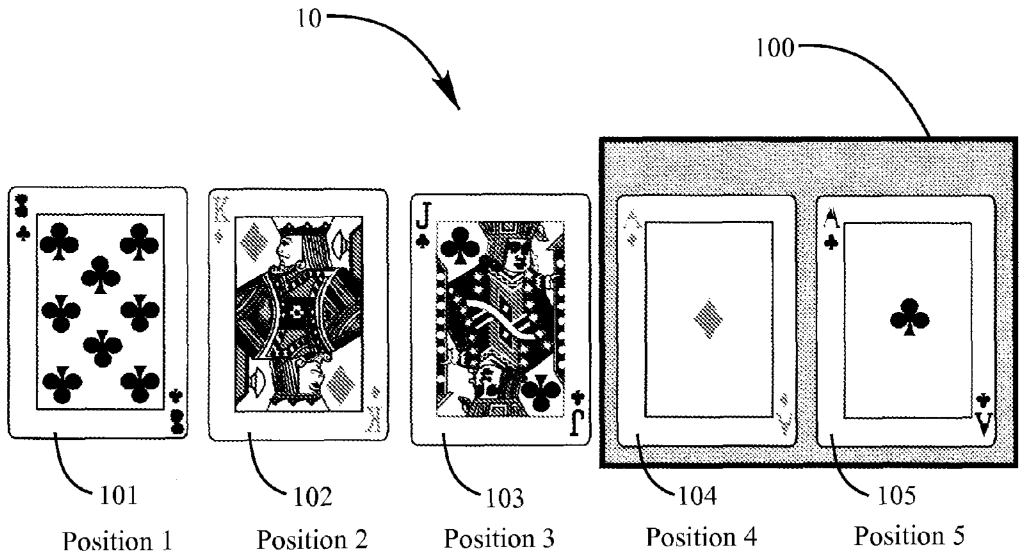
FIG. 1A is an opening first poker hand.

FIG. 1A illustrates an opening first hand 10 with cards 101, 102, 103, 104, 105, dealt respectively in positions 1, 2, 3, 4, 5. Slide Bonus pair 100 is triggered by the pair of aces 104, 105 dealt in positions 4, 5. This pair of aces 104, 105 must be held in order to trigger the Slide Bonus. Although a pair of aces is used in this illustration, any pair will trigger the Slide Bonus.

Figure 1B:
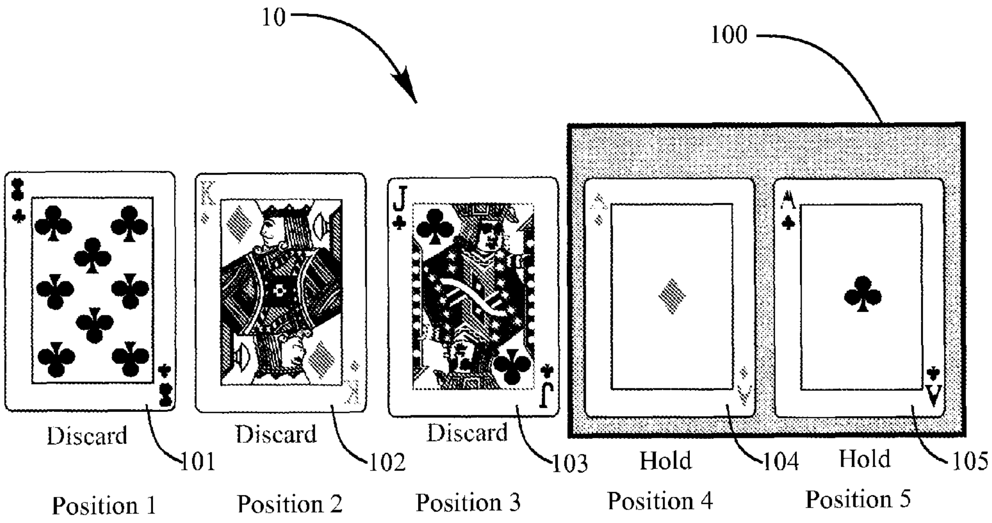
FIG. 1B shows which cards are to be held and which cards are to be discarded in the first poker hand.

FIG. 1B illustrates the opening hand with the Slide Bonus pair 100 triggered with the aces 104, 105 held in positions 4, 5 and cards in positions 1, 2, 3 discarded.

Figure 1C:
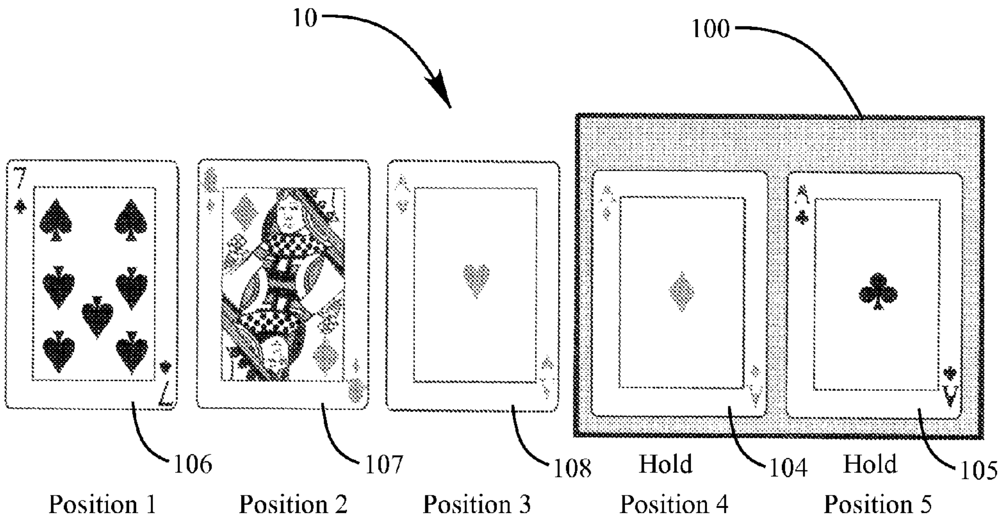
FIG. 1C shows the Slide Bonus pair of aces as the held cards plus three new cards dealt to the first poker hand.

FIG. 1C illustrates conclusion of the opening first hand with the Slide Bonus pair 100 in positions 4, 5 and the replacement cards 106, 107, 108 in positions 1, 2, 3 drawn to the hand to complete the five card hand. The first hand 10 now contains three aces 108, 104, and 105 and the hand is paid based on a predetermined pay scale.

Figure 1D:
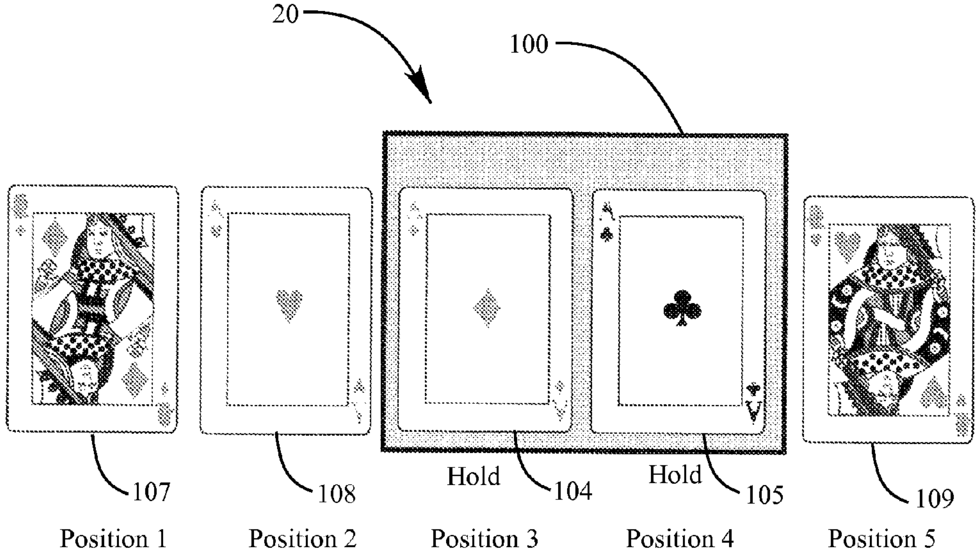
FIG. 1D shows the first slide or shift of the Slide Bonus pair of aces and the creation or formation of a second poker hand.

FIG. 1D illustrates a second hand 20 with the Slide Bonus pair 100 continued, the first card 106 in position 1 being removed and all of the remaining cards being moved to the left one position, including the Slide Bonus pair 104, 105. A replacement card 109 is dealt on the far right at position 5. The second hand 20 contains a full house of three aces and two queens and is paid based on a predetermined pay scale.

Figure 1E:
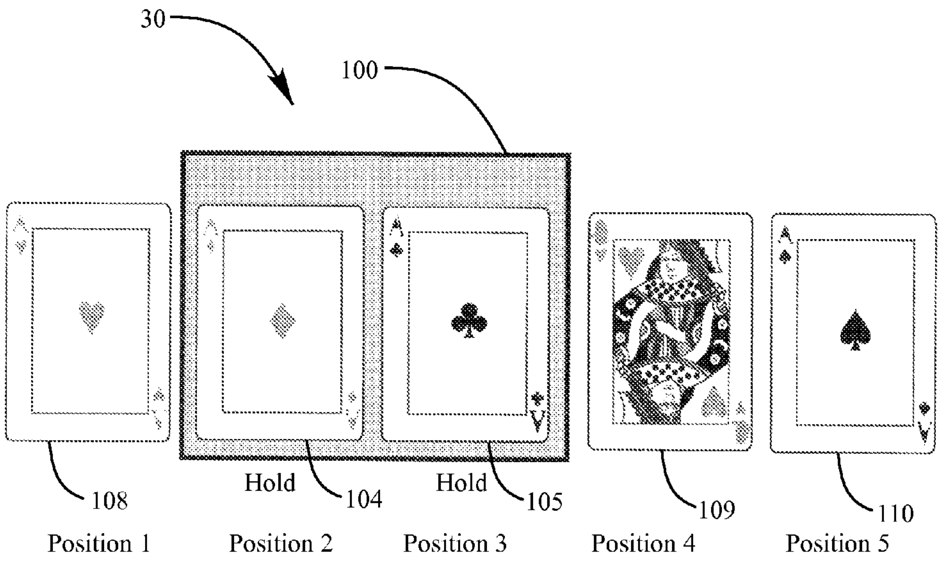
FIG. 1E shows the second slide or shift of the Slide Bonus pair of aces and the creation of a third poker hand.

FIG. 1E illustrates a third hand 30 with the Slide Bonus pair 100, the first card 107 being removed and all of the remaining cards being moved to the left one position, including the Slide Bonus pair 100 of aces 104, 105. A replacement card 110 is dealt on the far right. The third hand 30 now contains four aces and is paid based on a predetermined pay scale.

Figure 1F:
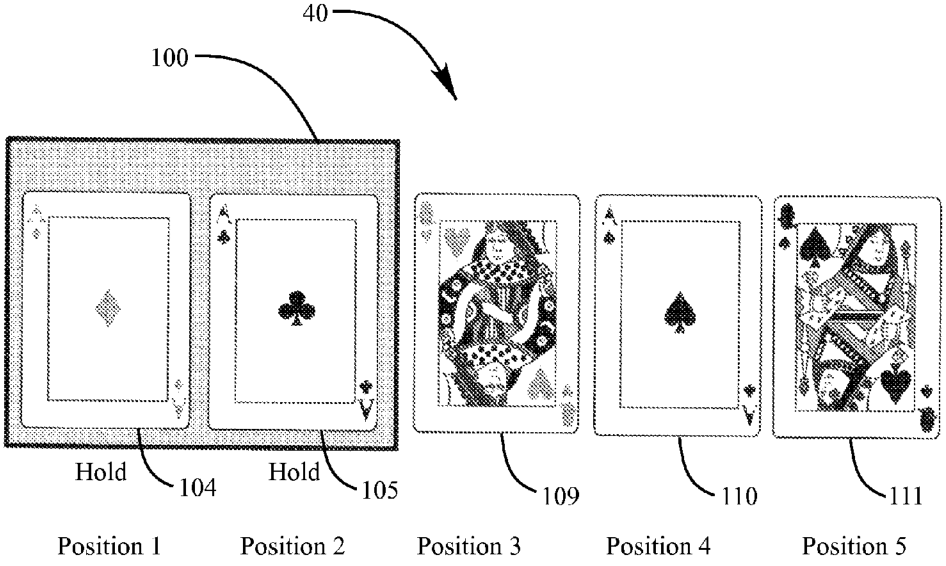
FIG. 1F shows the third and final slide or shift of the Slide Bonus pair of aces and the creation of a fourth poker hand.

FIG. 1F illustrates a fourth and final hand 40 with the Slide Bonus pair 100, the first card 108 being removed and all of the remaining cards being moved to the left one position, including the Slide Bonus pair 100. A final replacement card 111 is dealt in position 5 to complete the Slide Bonus game. This final hand contains a full house of three aces and two queens and is paid based on a predetermined pay scale.

Once the Slide Bonus pair 100 slides or shifts all the way to the left to positions 1, 2, the game is completed and all the winnings from each hand of the cards are calculated and may appear on a credit meter.

Figure 2:
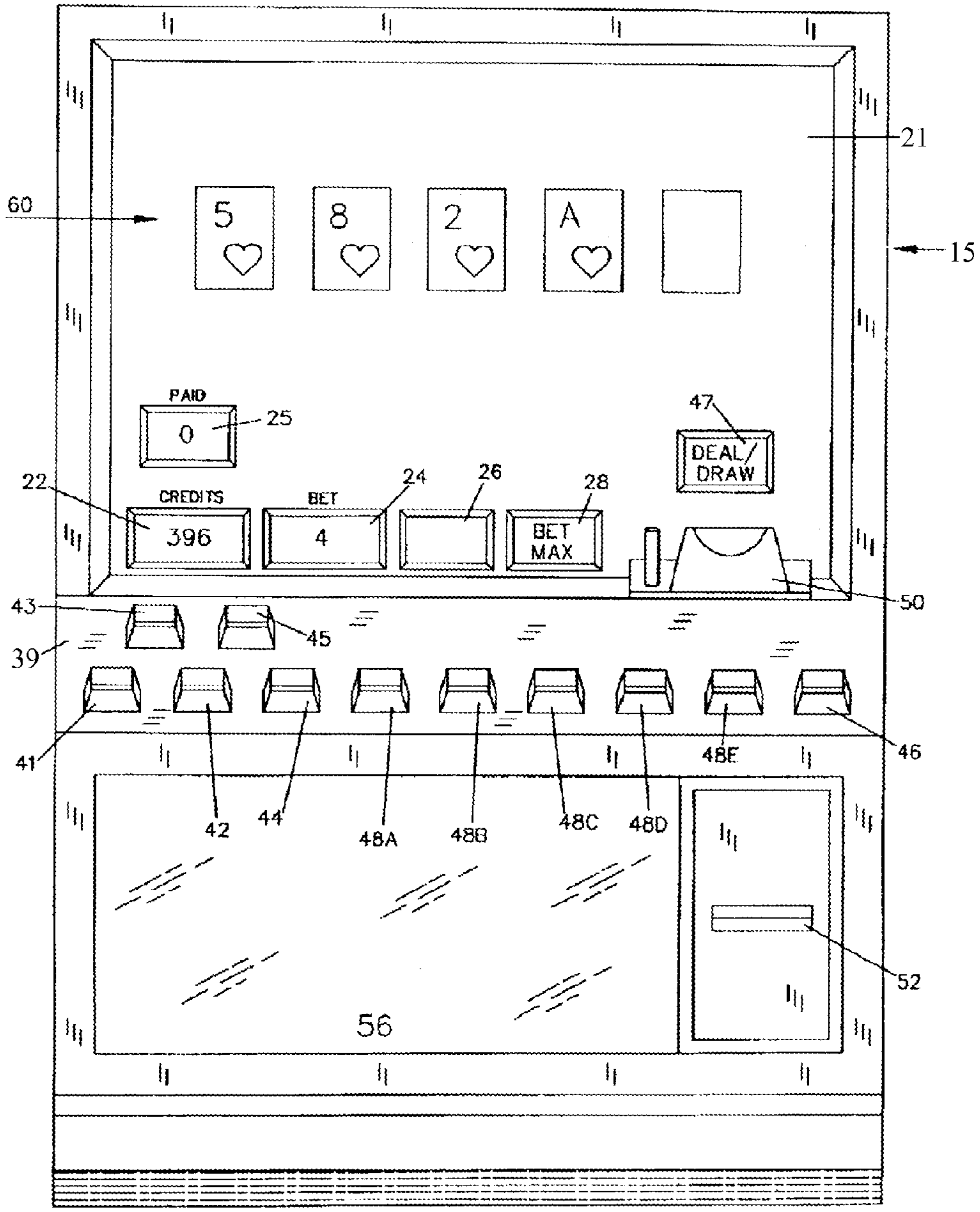
FIG. 2 shows a typical electronic video gaming machine.

FIG. 2 shows a typical electronic video gaming machine 15 that is configured to provide a player apparatus for a poker game such as the method and system of the present invention. The electronic video gaming machine 15 includes a conventional coin acceptor 50 into which the player can insert coins or gaming tokens and a bill acceptor 52 mounted to the gaming machine 15 and into which the player can insert paper currency or a ticket-in ticket-out (TITO). The use of coins, tokens, paper currency or TITO, is one mechanism by which a player may wager on the poker hands the player wishes to play. Also in the electronic video gaming machine 15, a credit meter display 22 is provided to show the amount of credits that the player has accrued on the gaming machine 15, either by inserting coins, tokens, paper currency, TITO, or from winning plays achieved by the player. Whenever the player makes a wager, the amount of the wager is subtracted from the credit meter display 22. Whenever the player achieves a winning play during the play of the game, the amount of the winning play is added to the credit meter display 22.

A conventional payout hopper is also located on the interior of the gaming machine and is used to dispense coins or tokens to the player into a payout tray 56 when the player wishes to collect any winning amounts the player has accrued. Other suitable and conventional payout mechanisms can be used, such as a ticket printer (TITO) or other cashless payout devices.

The gaming machine 15 also includes a video screen display 21 of any suitable size or type upon which representations of playing cards are displayed. In one embodiment, one or more hands can be displayed on the video screen display 21 at the same time. As illustrated in FIG. 2, a first hand is shown at location 60. Each hand would preferably have five card locations typically from left to right in a horizontal row, although other manners of displaying multiple hands including stacks of cards can be used. The video screen display 21 also contains a location at which the amount wagered on each hand is shown, for example, "Bet" 24. In this illustration, the player has bet 4 credits.

A button panel 39 is also provided on the gaming machine 15 with buttons mounted on the button panel 39 to be used by the player to control the operation of the gaming machine 15. Any suitable number or configuration of the buttons on the button panel can be used and, alternatively, conventional touch screen technology can be used for any or all of the buttons mounted on the button panel.

A typical button arrangement is shown on the button panel 39 in FIG. 2. A BET ONE button 42 is provided to allow the player to wager one credit at a time. A BET MAX button 44 is provided to allow the player to wager the maximum amount of credits permitted by the configuration of the gaming machine 15. Any number of credits can be set as the minimum or maximum amount that it is possible to wager on each hand. Typically, five credits may be the maximum number of credits for any particular hand. Alternatively, a BET ONE location 26 and a BET MAX location 28 can be provided on the video screen 21 to allow the player to wager by using conventional touch screen technology.

A conventional DEAL/DRAW button 46 is also provided on the button panel 39 which is used by the player to activate the initial deal of the cards at the deal stage of the method of play or the dealing of replacement cards at the draw stage of the method of play as is appropriate. Similarly, a DEAL/DRAW location 47 can be provided on the video screen 21 to allow the player to select either the deal step or the draw step by using conventional touch screen technology. The button panel 39 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. The method of play of the various versions of the present invention will now be described. After the player has inserted an appropriate amount of coins, tokens, paper currency, or TITO to add a sufficient amount of credits on the credit display meter 22, the player makes his initial wager. The player may press the BET ONE button 42 one or more times to bet in single increments or the player may merely press the BET MAX button 44 and the maximum number of credits are applied, for example, five credits would be wagered. The player can also use the touch screen locations to make his wager as described above.

To play the poker game, the player establishes a pool of credits, sets the wager, deals the cards, chooses which cards to hold and discard, draws replacement cards, and collects credits for winning card combinations, with enhancements.

Buttons

In one embodiment, a set of buttons are mounted on the button panel 39 and are used by the player to control the functions of the poker game: Bet One 42, Bet Max 44, Deal/Draw 46, Help 43, Pay Table 45, and Cash Out 41. Any or all of these control buttons may be displayed on the video display 21 and/or buttons electronically connected to the gaming device. If necessary, any number of buttons may be added to further facilitate control of the game, such as Hold buttons to "hold" the cards displayed on the video.

Meters

In one embodiment, meters are shown on the video display screen to display the salient information for the game: Credits meter 22, Bet meter 24, and Paid meter 25. The Credits meter 22 displays the total number credits remaining in the credit pool; the Bet meter 24 displays the amount wagered on the current, previous, and/or upcoming poker hand and is associated with the Bet One 42 and Bet Max 44 buttons; and the Paid meter 25 displays the amount of credits won on the current or previous poker hand.

Credit Pool

In one embodiment, the player deposits coins, tokens, paper currency, TITO, credit cards, debit cards, or other forms of physical and/or electronic currency into the coin acceptor slot 50 or a paper currency bill acceptor 52 to establish a pool of credits. The amount of this common pool of credits is displayed to the player on the Credit meter 22. The pool of credits increases and decreases according to the player's wins or losses and may be supplemented, if necessary, by the player by additional deposits of coins, tokens, paper currency, TITO, credit cards, debit cards, or other forms of physical and/or electronic currency.

Set the Wager

In one embodiment, the player sets the value of the wager by using the Bet One 42 and Bet Max 44 buttons. The bet may range between one credit and N-credits, with N equal to a predetermined maximum or set by the current value of the credit pool. The typical video poker gaming machine uses a five credit maximum wager.

Deck of Cards

In one embodiment, each card dealt is selected from one or more suitable decks of cards such as one or more fifty-two card traditional decks (i.e. the traditional four suits of Spades, Hearts, Diamonds, Clubs, with thirteen ranks in each suit of two, three, four, five, six, seven, eight, nine, ten, Jack, Queen, King and Ace) plus bonus cards that may be added before or after the deal or the draw. Custom decks may also be used.

Deal of Cards

In one embodiment, the player causes the machine 15 to deal the cards by pressing the Deal button 46. Once the Deal button 46 is pressed, the wager is final and non-refundable. For each deal, the machine 15 randomly displays five cards face-up in the five card positions 1, 2, 3, 4, 5. In a single standard deck embodiment, a displayed card is removed from the deck and may not be dealt again during that game. Typically, only the remaining non-dealt cards in the deck are used to replace a dealt card.

Hold and Discard

In one embodiment, the player selects which cards to hold and which cards to discard using the buttons on the machine

15 or touching the cards on the video display 21 (i.e. pressing a button or touching a card will "hold" the card) Alternatively, the machine 15 may automatically select cards to hold and/or discard and then allow the player to override the selections by using the buttons or touching the display screen 21. This may be useful in a training mode.

Winning Card Combinations

In one embodiment, the player is paid for predetermined winning combinations of cards that appear in each final hand. Each winning combination pays the amount indicated on a pre-determined pay scale times the total amount wagered on that hand.

SUMMARY

The foregoing description of various embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A method of playing multiple, sequential games of video poker with a processor wherein five cards are dealt face up in positions 1, 2, 3, 4, 5 numbered from the left or numbered from the right and the player has the option of holding selected cards and discarding selected cards to be replaced by a draw so as to form a first poker hand, and wherein a pair is dealt or drawn in positions 4, 5 of the first poker hand;

the improvement which comprises forming a second poker hand by deleting the card in position 1 of the first poker hand; shifting the cards in positions 2, 3 to positions 1, 2; shifting the pair in positions 4, 5 to positions 3, 4; and dealing a replacement card to the vacant position 5 so as to form a second poker hand;

forming a third poker hand by deleting the card in position 1 of the second poker hand; shifting the card in position 2 to position 1; shifting the pair in positions 3, 4 is to positions 2, 3; shifting the card in position 5 to position 4; and dealing a replacement card to vacant position 5 so as to form a third poker hand;

and forming a fourth poker hand by deleting the card in position 1 of the third poker hand; shifting the pair in positions 2, 3 to positions 1, 2; shifting the cards in positions 4, 5 to positions 3, 4; and dealing a replacement card to vacant position 5 so as to create a fourth poker hand.

2. The method of claim 1 wherein a separate wager is placed for each poker hand one to four before each poker hand is dealt.

3. The method of claim 1 wherein one wager is placed for all four poker hands before the first poker hand is dealt.

4. The method of claim 1 wherein the cards in each poker hand are dealt from a separate deck of cards.

5. The method of claim 1 wherein the cards in each poker hand are dealt from the same standard deck of 52 cards.

6. The method of claim 1 wherein the cards in each poker hand are dealt from multiple decks of cards.

7. A method of playing consecutive games of video poker with a computer using a processor, a random number generator, and a video screen wherein five cards are dealt face up in positions 1, 2, 3, 4, 5 numbered from the left or numbered from the right and the player has the option of holding selected cards and discarding selected cards to be replaced by a draw so as to form a first poker hand and wherein a pair is dealt or drawn in positions 4, 5, said method comprising:

forming a second poker hand by deleting the card in position 1 of the first poker hand; shifting the cards in positions 2, 3 to positions 1, 2; shifting the pair in positions 4, 5 to positions 3, 4; and dealing a replacement card to the vacant position 5 so as to form a second poker hand;

forming a third poker hand by deleting the card in position 1 of the second poker hand; shifting the card in position 2 to position 1; shifting the pair in positions 3, 4 to positions 2, 3; shifting the card in position 5 to position 4; and dealing a replacement card to vacant position 5 so as to form a third poker hand;

forming a fourth poker hand by deleting the card in position 1 of the third poker hand; shifting the pair in positions 2, 3 to positions 1, 2; shifting the cards in positions 4, 5 to positions 3, 4; and dealing a replacement card to vacant position 5 so as to form a fourth poker hand.

8. The method of claim 7 wherein a separate wager is placed for each poker hand one to four before each poker hand is dealt.

9. The method of claim 7 wherein one wager is placed for all four poker hands before the first poker hand is dealt.

10. The method of claim 7 wherein the cards in each poker hand are dealt from a separate deck of cards.

11. The method of claim 7 wherein the cards in each poker hand are dealt from the same standard deck of 52 cards.

12. The method of claim 7 wherein the cards in each poker hand are dealt from multiple decks of cards.

13. A system of playing a game of video poker with a computer processor, a random number generator, and a video display wherein five cards are dealt face up in positions 1, 2, 3, 4, 5 numbered from the left or numbered from the right and the player has the option of holding selected cards and discarding selected cards to be replaced by a draw so as to create a first poker hand and a pair is dealt or drawn in positions 4, 5;

the improvement wherein the card in position 1 of the first poker hand is deleted; the cards in positions 2, 3 are shifted to positions 1, 2; the pair in positions 4, 5 is shifted to positions 3, 4; and a replacement card is dealt to the vacant position 5 so as to create a second poker hand;

the card in position 1 of the second poker hand is deleted; the card in position 2 is shifted to position 1; the pair in positions 3, 4 is shifted to positions 2, 3; the card in position 5 is shifted to position 4; and a replacement card is dealt to vacant position 5 so as to create a third poker hand;

the card in position 1 of the third poker hand is deleted; the pair in positions 2, 3 is shifted to positions 1, 2; the cards in positions 4, 5 are shifted to positions 3, 4; and a replacement card is dealt to vacant position 5 so as to create a fourth poker hand.

14. The system of claim 13 wherein a separate wager is placed for each poker hand one to four before each poker hand is dealt.

15. The system of claim 13 wherein one wager is placed for all four poker hands before the first poker hand is dealt.

16. The system of claim 13 wherein the cards in each poker hand are dealt from a separate deck of cards.

17. The system of claim 13 wherein the cards in each poker hand are dealt from the same deck of cards.

18. The system of claim 13 wherein the cards in each poker hand are dealt from multiple decks of cards.

* * * * *